July 3, 1962  P. MUCHNICK ET AL  3,042,848
VOLTAGE REGULATOR
Filed July 22, 1957                                                       2 Sheets-Sheet 1
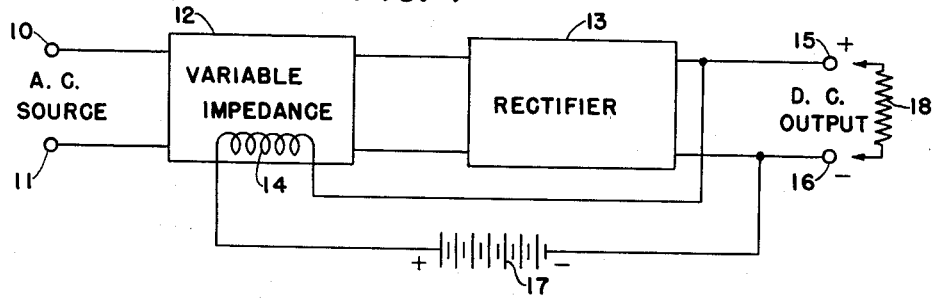
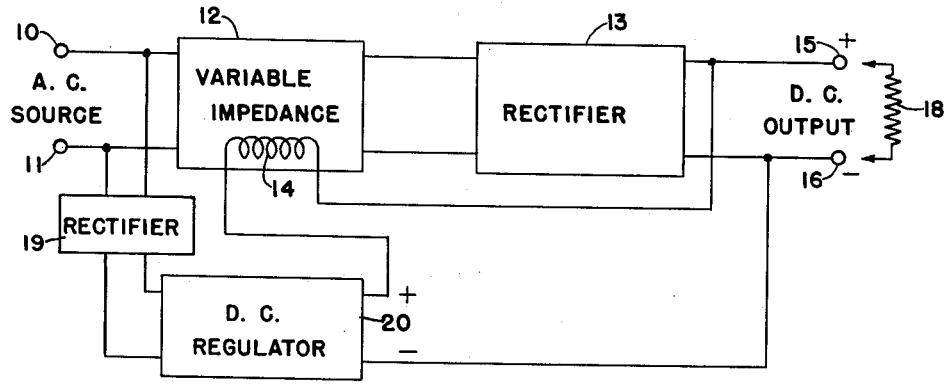
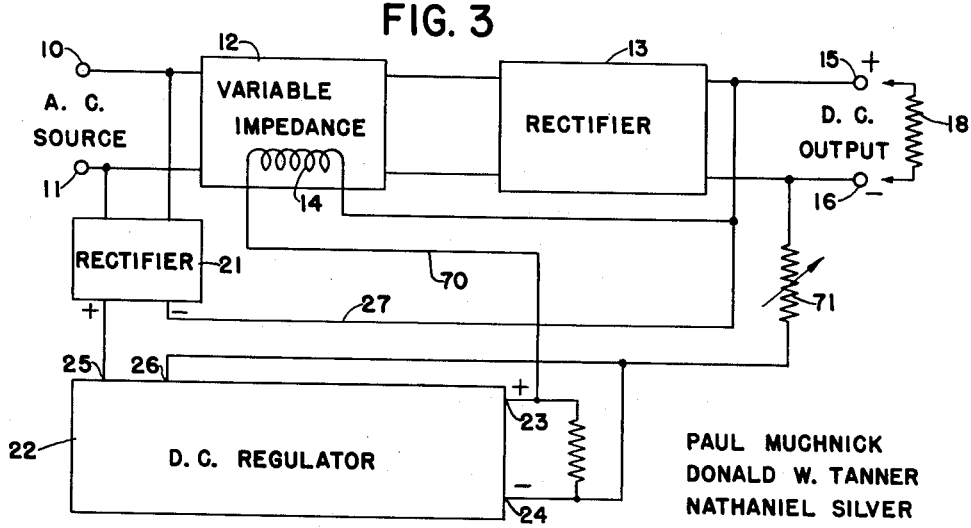
PAUL MUCHNICK
DONALD W. TANNER
NATHANIEL SILVER
LEO L. HELTERLINE, JR.
INVENTORS
BY Ralph E. Bitner
ATTORNEY July 3, 1962   P. MUCHNICK ET AL   3,042,848
VOLTAGE REGULATOR
Filed July 22, 1957   2 Sheets-Sheet 2

PAUL MUCHNICK
DONALD W. TANNER
NATHANIEL SILVER
LEO L. HELTERLINE, JR.
INVENTORS

BY Ralph E. Bitner

ATTORNEY

United States Patent Office 3,042,848
Patented July 3, 1962

3,042,848
VOLTAGE REGULATOR
Paul Muchnick, Norwalk, and Donald W. Tanner and Nathaniel Silver, Stamford, and Leo L. Helterline, Jr., Norwalk, Conn., assignors, by mesne assignments, to Raytheon Company, a corporation of Delaware
Filed July 22, 1957, Ser. No. 673,200
6 Claims. (Cl. 321—19)

This invention relates to a voltage regulator for regulating the direct current voltage derived from an alternating current supply line. It has particular reference to the circuit arrangement for sensing the output voltage and for applying an error signal to a control winding by means of a direct current source.

The invention comprises a saturable reactor with a control winding, power for the control winding being derived from a sensing circuit and a direct current power reference connected to the output terminals of the regulated circuit. Some of the principles of operation have been used before but in previous regulators the amplifier circuit controlling the current through the control coil had a high impedance output circuit and this necessitated a control winding having high inductance and a large number of turns. For this reason the response time to a sudden change of voltage of the supply line or to a change of impedance in the load was very slow. The present invention uses a control winding having a small number of turns and low inductance thereby making the response time short and greatly increasing the efficiency and usefulness of the regulator.

Prior art regulators have been restricted to a definite output voltage range which did not cover a wide range of values. The present invention uses a novel arrangement placing the output direct current in series with a low voltage direct current power reference source. This connection permits a range of output voltages from 6 to 300 volts.

One of the objects of this invention is to provide an improved voltage regulator circuit which avoids one or more of the disadvantages and limitations of prior art circuits.

Another object of the invenion is to increase the range of voltages available at the output terminals of a voltage regulator.

Another object of the invention is to provide a voltage regulator circuit having improved response time and a more closely regulated voltage.

Another object of the invention is to simplify the amplifier circuit used in conjunction with the error signal.

Another object of the invention is to provide a voltage regulator circuit which can be easily over-compensated by the use of a minimum of components.

The invention comprises a voltage regulator circuit for maintaining a direct current voltage at a pre-determined value even though the load and the applied alternating current power may both vary considerably. The circuit includes a rectifier for converting the alternating current to direct current, a variable impedance controlled by the direct current in a control winding, and a source of direct current voltage which acts as a power reference. An amplifier which may or may not be a direct current transistor amplifier is employed as part of the reference voltage.

For a better understanding of the present invention, together with other and further objects hereof, reference is made to the following description taken in connection with the accompanying drawings.

FIG. 1 is a schematic diagram of connections of a simplified version of the regulator showing a rectifier used with a battery as a voltage reference and a variable impedance in block.

FIG. 2 is a schematic diagram of connections similar to FIG. 1 but having a regulated direct current supply instead of a battery.

FIG. 3 is a schematic diagram of connections similar to FIG. 2 but showing how the regulated direct current source may be connected in series with the D.C. load voltage to produce a regulated supply which can vary within a wide range of values.

Figure 4:
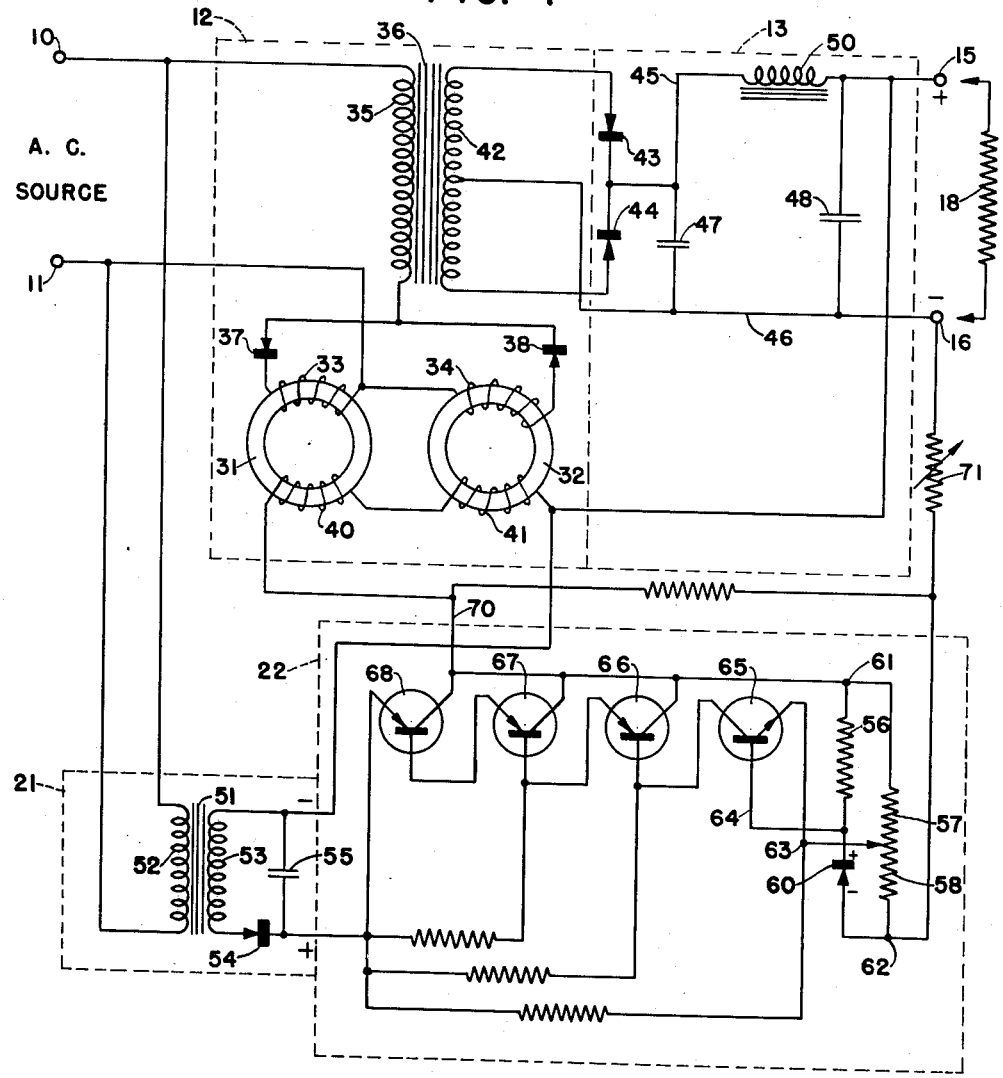
FIG. 4 is a detailed schematic diagram of connections showing all the components of the circuit of FIG. 3. This circuit shows an amplifier having three transistor amplifying elements and a fourth transistor employed as a passing impedance in series with a source of direct current potential and a pair of control windings.

Referring now to FIG. 1 the circuit includes a pair of input terminals 10, 11, which are to be connected to a source of alternating current which may vary considerably in supply voltage. A variable impedance 12 and rectifier 13 are indicated in block form with a control winding 14 which is used to vary the impedance value and maintain a constant voltage at direct current output terminals 15 and 16. In this simplified circuit a single battery 17 is used as the reference voltage and its voltage must be equal to the output voltage delivered at terminals 14 and 15 to a load circuit 18. This circuit is shown for reference only and indicates the class of regulator circuits employed.

The circuit shown in FIG. 2 is similar to that shown in FIG. 1 and contains the variable impedance 12, the rectifier 13, the control coil 14, output terminals 15 and 16, and the load 18. In FIG. 2 the battery has been replaced by a rectifier 19 and a D.C. regulator 20 having a pair of secondary output terminals. This regulator may be over-compensated in order to provide for the voltage drop in control coil 14. This type of voltage regulator produces excellent results especially when the resistance of coil 14 is low. A small change in the output terminals 15 and 16 produces a large change in current through coil 14 and permits accurate and fast regulation of the circuit. The circuit shown in FIG. 2, however, has one disadvantage; in order to adjust for a wide range of output voltages, the regulated D.C. supply must itself be adjustable over the same wide range.

The circuit shown in FIG. 3 is similar to that shown in FIG. 2 but can be used with a range of voltages which may vary anywhere between 5 and 300 volts. This circuit includes similar components to that shown in FIG. 2 but the regulator circuit 22, which regulates the output voltage at terminals 23 and 24 is designed to produce a voltage which is slightly above the desired output voltage at terminals 15 and 16. To accomplish this result the input terminals 25 and 26 of the regulator 22 are connected in series with the output terminals of the rectifier 21 and the output circuit of rectifier 13. The output voltage 15—16 is added to the voltage of rectifier 21 and the sum is applied to terminals 25—26. This circuit may be traced from the input terminal 25 of the D.C. regulator, to the positive terminal of the rectifier 21, then from the negative terminal of this source over conductor 27 to positive terminal 15 of the output circuit, then from the negative terminal 16, back to terminal 26 in series with the variable resistor 71. It is evident that the input voltage on terminals 25 and 26 is always equal to the voltage of rectifier 21 plus the output voltage across the load 18 minus the voltage drop across resistor 71.

The output of the regulator circuit 22 is connected in series with variable resistor 71, the output circuit 15—16, and the control coil 14. This circuit may be traced from terminal 23, thence via connection 70, through control coil 14, through the output load circuit 15—16 through series resistor 71 and back to terminal 24 on the regulator. This circuit insures that the voltage applied to control coil 14 is equal to the voltage across resistor 71 plus the regulator voltage (23—24) minus the output load voltage (15—16).

The circuit shown in FIG. 4 is the same as FIG. 3 except that all components are shown in detail. The variable impedance 12 includes two saturable cores 31 and 32, each core containing an alternating current windings 33 and 34, these windings being in series with each other and connected through a primary winding 35 of a transformer 36, one end of which is connected to terminal 10. Rectifier units 37 and 38 are connected in series with coils 33 and 34 so that only direct current pulses pass through the coils and provide a magnetic self-bias for the cores. The junction point of the two coils is connected to terminal 11.

The amount of alternating current passing through coils 33 and 34 and the primary winding 35 of transformer 36 is controlled by direct current coils 40 and 41, these two coils being equivalent to control coil 14 shown in FIGS. 1, 2, and 3.

Transformer 36 includes a secondary winding 42 which is connected to rectifier units 43 and 44 to produce positive pulses on conductor 45 and negative pulses on conductor 46 which may be grounded. After being filtered by a direct current filter circuit which includes parallel capacitors 47 and 48 and a series inductor 50 direct current is produced at terminals 15 and 16 and made available to a load resistor 18.

The D.C. source 21 may include any type of rectifying circuit and is shown in FIG. 4 as a transformer 51 having a primary winding 52 connected across the A.C. source terminals 10 and 11 and a secondary winding 53 which is connected to a rectifier unit 54 and a filtering capacitor 55 to produce a second source of direct current. This source need only be 3 or 4 volts since it is designed to compensate for the voltage drop through the passing impedance 68.

The direct current power reference circuit 22 may include any type of sensing circuit, any amplifier circuit which may employ vacuum tubes, transistors, or magnetic amplifiers; and a passing impedance which may be any well-known direct current type. The sensing circuit in this particular application is a four-armed bridge, which includes three resistors 56, 57, and 58, as three of the bridge arms and a zener diode 60 as the fourth arm. The zener diode is well-known and comprises a semi-conductor diode connected in the circuit in a manner which is the reverse of the usual polarity. It then operates to maintain a constant voltage across its terminals. The direct current supply for this bridge is applied to junction points 61 and 62 and the unbalance voltage is derived from the other two bridge junctions 63 and 64, these junctions being connected to the input circuit of a transistor amplifier which includes amplifier units 65, 66, and 67, and a transistor passing stage 68. The usual coupling circuits and direct current supply circuits are provided for this amplifier, the positive supply line connected to rectifier 54 while the negative supply line is connected to the negative terminal 16 in series with resistor 71.

The operation of this circuit is as follows: If the terminal voltage at 15—16 is desired to be 6 volts, resistor 71 is made zero. Then the voltage drop between terminal 16 and point 61 must be equal to 6 volts plus the voltage drop across the control coils 40 and 41, the current through the coils is determined by this voltage drop and the coil resistance. Now, if the output voltage across terminals 15 and 16 tends to fall because of a change in the load 18, the voltage across the coils increases (since the sum of the output voltage plus the control voltage is always equal to the regulated voltage at 61—62). The control coil voltage and current rise and the resulting increase in magnetic flux increases the saturation of cores 31 and 32 thereby lowering the reactance of coils 33 and 34 and increasing the output voltage at the load 18 to its original desired value.

If a much higher output voltage is desired, say 250 volts, at terminals 15 and 16, resistor 71 is increased in value until its voltage drop is about 242 volts. This causes the current to rise in the control coils until the voltage drop across them is about 3 volts. Then the output voltage is equal to the drop across resistor 71 (242 v.) plus the drop across the control coils (3 v.) plus the regulated voltage at terminals 61—62 (assumed equal to 5 v.) or a voltage of 250 as required. The increased voltage across the coils obviously increases the core saturation and raises the output voltage as described above. Regulation of this voltage is accomplished in the same manner as in the case where a lower output voltage is produced.

From the above description it will be obvious that regulated voltages may be produced by the circuit shown, the output voltages being adjustable to a range of values far in excess of previously obtainable voltages.

While a transistor amplifier has been described and shown in the drawings it will be obvious that any kind of an amplifier circuit can be employed. Other circuit components may be changed without altering the field of the invention which should be limited only by the scope of the appended claims.

We claim:

1. A voltage regulator comprising; a saturable reactor connected between an alternating current source and a rectifier which produces direct current at a pair of output terminals; a control coil associated with said saturable reactor and adapted to vary the reactance of said reactor when a direct current through the coil is varied; a control circuit connected across the output terminals and including in series connection, said control coil, a sensing circuit with a voltage reference component, and an adjustable resistor; a controllable impedance connected across said control coil in series with a direct current power supply for varying the current in the coil; and coupling means connected between the sensing circuit and said controllable impedance for controlling the impedance in response to an error voltage derived from the sensing circuit.

2. A voltage regulator as set forth in claim 1 wherein said controllable impedance is a transistor.

3. A voltage regulator as set forth in claim 1 wherein said sensing circuit is a four-armed bridge with one arm containing a zener diode and the other three arms each containing a resistor.

4. A voltage regulator as set forth in claim 1 wherein said coupling between the controllable impedance and the sensing circuit includes a direct current amplifier.

5. A voltage regulator as set forth in claim 1 wherein said direct current power supply is produced by a rectifier coupled to said alternating current source.

6. A voltage regulator comprising; a saturable reactor connected between an alternating current source and a rectifier which produces direct current at a pair of output terminals; a control coil associated with said saturable reactor and adapted to vary the reactance of said reactor when a direct current through the coil is varied; a control circuit connected across the output terminals and including in series connection, said control coil, a sensing circuit with a zener diode reference, and an adjustable resistor; a passing transistor connected across said control coil in series with a direct current power supply for varying the current in the coil; and a direct current amplifier connected between the sensing circuit and the passing transistor for applying an amplified error voltage to the transistor to vary its resistance in response to the error voltage.

References Cited in the file of this patent
UNITED STATES PATENTS

| | | |
|---|---|---|
| 2,431,311 | Cronvall | Nov. 25, 1947 |
| 2,549,782 | Engelman | Apr. 24, 1951 |
| 2,723,372 | Eagan et al. | Nov. 8, 1955 |
| 2,751,545 | Chase | June 19, 1956 |
| 2,752,551 | Bixby | June 26, 1956 |
| 2,790,127 | Hamilton | Apr. 23, 1957 |
| 2,810,877 | Silver | Oct. 22, 1957 |
| 2,878,437 | Christie et al. | Mar. 17, 1959 |